No. 810,570. PATENTED JAN. 23, 1906.
C. W. SAGEE.
MACHINE FOR MOLDING GLASS.
APPLICATION FILED JULY 22, 1905.
2 SHEETS—SHEET 1.
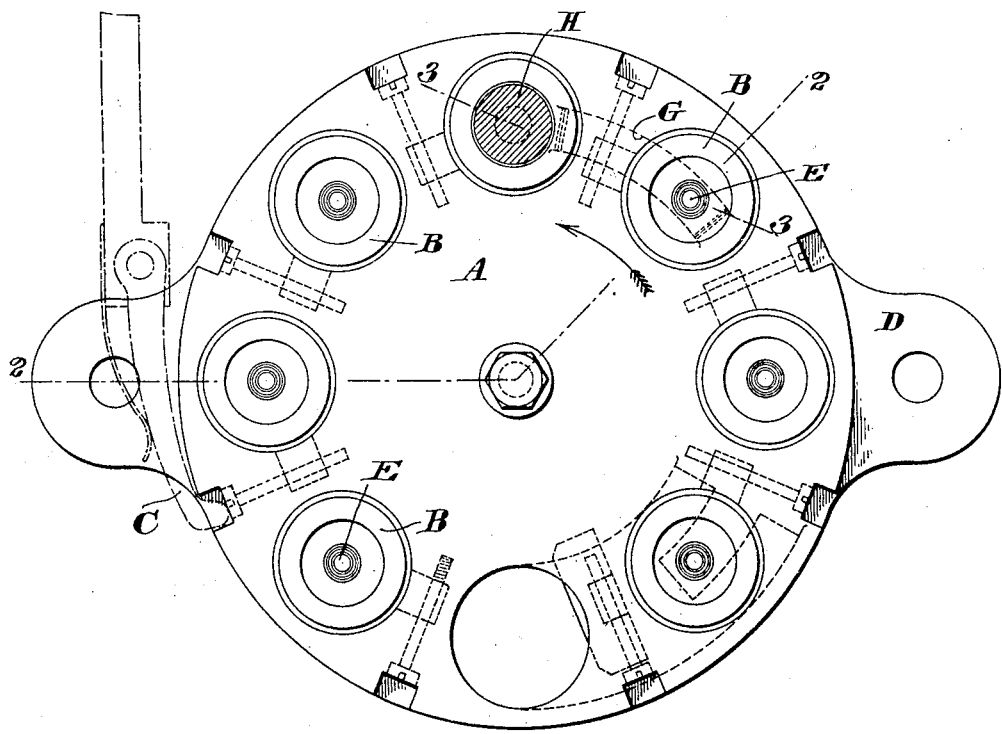
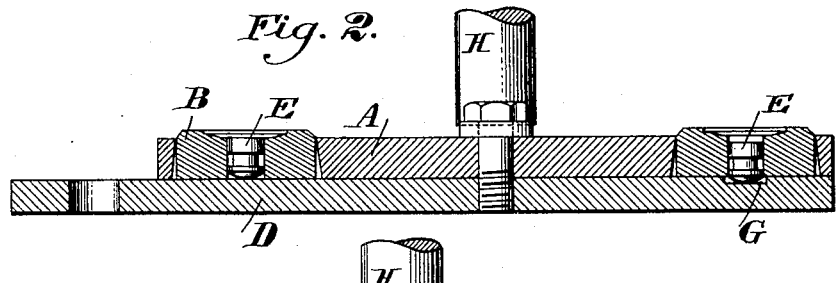
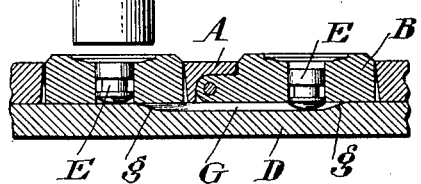
Witnesses:
Henry Drury
M. M. Hamilton
Inventor:
Charles W. Sagee
by
Harding & Harding
attys No. 810,570. PATENTED JAN. 23, 1906.
C. W. SAGEE.
MACHINE FOR MOLDING GLASS.
APPLICATION FILED JULY 22, 1905.

2 SHEETS—SHEET 2.

Witnesses:

Inventor:

UNITED STATES PATENT OFFICE.

CHARLES W. SAGEE, OF PHILADELPHIA, PENNSYLVANIA, ASSIGNOR TO HERO FRUIT JAR COMPANY, OF PHILADELPHIA, PENNSYLVANIA, A CORPORATION OF PENNSYLVANIA.

MACHINE FOR MOLDING GLASS.

No. 810,570.     Specification of Letters Patent.     Patented Jan. 23, 1906.

Application filed July 22, 1905. Serial No. 270,873.

*To all whom it may concern:*

Be it known that I, CHARLES W. SAGEE, a citizen of the United States, residing at Philadelphia, county of Philadelphia, and State of Pennsylvania, have invented a new and useful Improvement in Machines for Molding Glass, of which the following is a full, clear, and exact description, reference being had to the accompanying drawings, which form a part of this specification.

In the machine for molding glass—as, for instance, jar tops or covers—the molds are hinged to a revolving table. At one point in the revolution of the table the glass is placed upon the center of the mold, and the table carries the mold beneath a plunger which, descending, presses the glass to conform to the mold. In the molds as now constructed the center when it receives the glass is flush with the remainder of the mold. With this construction it often happens that the movement of the table before reaching the plunger causes the glass or a part thereof to be moved off the center before it comes in line with the plunger, thus producing a defective article.

It is the object of my invention to cure this defect. Speaking generally, I accomplish this result by supporting the center of the mold with reference to the remainder of the mold so that it can fall below the remainder of the mold. I also construct the fixed plate below the table so that this center can drop at the point where the glass is placed in the mold and is caused to rise between that point and the operative position of the plunger. I also provide means to limit the downward movement of the center. By this construction the center which received the glass is below the remainder of the mold when it receives the glass and is brought to the level therewith when the mold is in line with the plunger, and thus all danger of the glass passing from the center in the movement of the table to the plunger is obviated.

I will first describe the embodiment of my invention illustrated in the accompanying drawings and then point out the invention in the claims.

Figure 4:
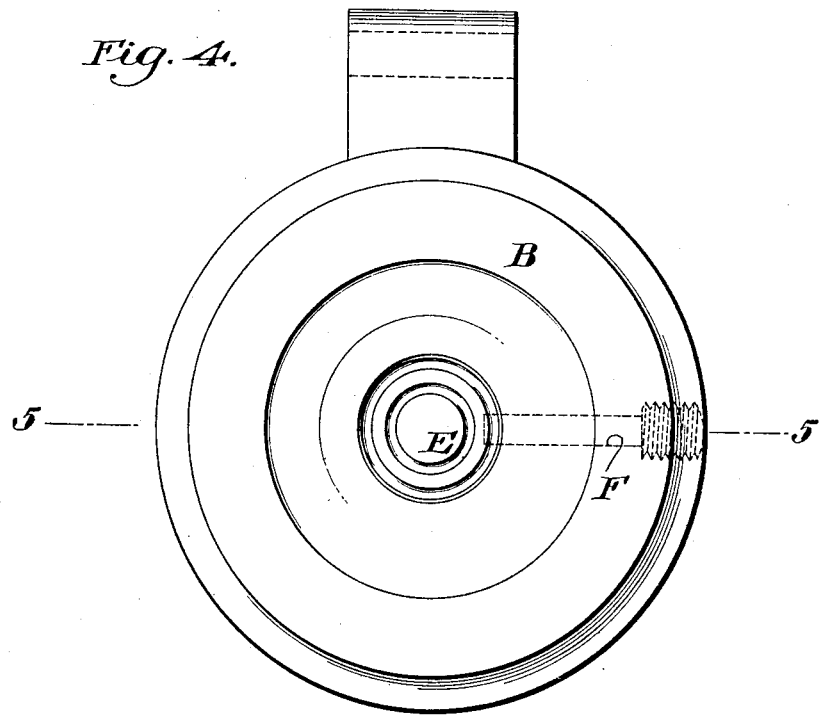
Figure 5:
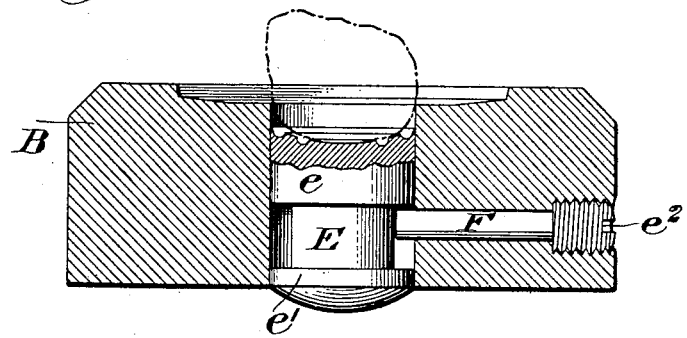

In the drawings, Figure 1 is a top plan view of mold-table, molds, and operating-pawl. Fig. 2 is a transverse section on the line 2 2, Fig. 1. Fig. 3 is a transverse section of a portion on the line 3 3, Fig. 1. Fig. 4 is a plan view of one of the hinged molds. Fig. 5 is a transverse section thereof on the line 5 5, Fig. 4.

A is the mold-table, to which the molds B are hinged, as in the regular construction. The mold-table is given a step-by-step rotary movement by the pawl C in the well-known manner. Beneath the rotary movable table A is the fixed plate D for normally holding the mold in its upper position. The mold B has the center E loose with respect to the remainder of the mold. A portion of the body of the center is cut away, forming collars $e\ e'$, between which rests the end of rod or pin F, which is inserted through an orifice in the wall of the mold, the rod or pin F and the wall of the orifice having coacting threads. The end of the rod has the slit $e^2$, which enables the rod to be unscrewed by a tool and the center-piece removed.

The movement of the center between its limits is shown in Fig. 3. The plate D at and near the point where the glass is received upon the mold is cut away, as shown at G, Fig. 3, so that at this point the upper face of the center-piece drops by gravity below the surface of the remainder of the mold. The plate D at each end of the portion G is provided with inclined surfaces $g\ g$, so that as the mold approaches the point of reception of the glass the center descends and as it approaches the line of the plunger H it is carried up and so that when it is in line with the plunger its upper surface is in line with the remainder of the mold.

From the foregoing description the operation, it is believed, may readily be understood. In the revolution of the table as the mold approaches the point where the molten glass is to be inserted the center is caused to descend below the surface of the mold and in this position receives the glass. In the movement of the table toward the plunger the center is carried up to the level of the surface of the mold, so that when the plunger acts it is in and held in its normal position.

Having now fully described my invention, what I claim, and desire to protect by Letters Patent, is—

1. In a glass-molding machine, the combination with a rotary table of a mold carried by the table, said mold having a center movable below its pressing position.

2. In a glass-molding machine, the combination, with a rotary table, of a mold carried by the table, said mold having a center movable below its pressing position, and means in one portion of the revolution of the table whereby said center moves below its pressing position.

3. In a glass-molding machine, the combination with a rotary table, of a mold carried by the table, said mold having a center movable below the pressing position, means in one portion of the revolution of the table whereby said center moves below its pressing position and means in the revolution of the table to return said center to its pressing position.

4. In a glass-molding machine, the combination with a rotary table and a fixed plate beneath the same, of a mold carried by the table, said mold having a center movable below its pressing position, there being a portion of said plate in line of movement of said center in the rotation of the table, cut away whereby the center moves below its pressing position.

5. In a glass-molding machine, the combination with a rotary table, and a fixed plate beneath the same, of a mold carried by the table, said mold having a center movable below its pressing position, there being a portion of said plate, in line of movement of said center, in the rotation of the table, cut away whereby the center moves below its pressing position, the ends of said cut-away portion inclining to the level of the surface of the plate.

6. In a glass-molding machine, the combination with a rotary table, of a mold carried by the table, said mold having a center movable below its pressing position, and means, in one portion of the revolution of the table, whereby said center-piece moves below its pressing position, and means to limit the movement of the center.

7. In a glass-molding machine, the combination with a rotary table, of a mold carried by the table, said mold having a center movable below its pressing position, means, in one portion of the revolution of the table, whereby said center-piece moves below its pressing position, means in the revolution of the table to return said center to its pressing position, and means to limit the movement of the center in either direction.

In testimony of which invention I have hereunto set my hand, at Philadelphia, on this 17th day of July, 1905.

CHARLES W. SAGEE.

Witnesses:
F. M. BROWER,
J. B. WOOD.